United States Patent [19]

La Belle

[11] Patent Number: 5,101,660
[45] Date of Patent: Apr. 7, 1992

[54] METHOD AND APPARATUS FOR ENABLING TWO OR FOUR WHEEL DRIVE VEHICLES TO BE TESTED UNDER SIMULATED ROAD CONDITIONS

[75] Inventor: John T. La Belle, Long Beach, Calif.
[73] Assignee: Clayton Industries, Santa Fe Springs, Calif.
[21] Appl. No.: 681,561
[22] Filed: Apr. 5, 1991
[51] Int. Cl.$^5$ .............................................. G01L 3/22
[52] U.S. Cl. .................................................. 73/117
[58] Field of Search ................... 73/117.3, 117, 123, 73/126

[56] References Cited

U.S. PATENT DOCUMENTS 4,161,116 7/1979 Fegraus et al. ..................... 73/117
4,327,578 5/1982 D'Angelo ........................... 73/117

OTHER PUBLICATIONS

Roy F. Knudsen, *Inertia—Electronically*, ISA Journal, vol. 5, No. 4, Apr. 1958, pp. 52–54.
S. D'Angelo and R. D. Gafford, *Feed-Forward Dynamometer Controller for High Speed Inertia Simulation*, SAE, Jun. 8–12, 1981.

*Primary Examiner*—Jerry W. Myracle
*Attorney, Agent, or Firm*—Harold L. Jackson

[57] ABSTRACT

A dynamometer apparatus and a method for testing two and four wheel drive vehicles under simulated road conditions is described. The apparatus includes a front roll and a rear roll for engaging the front and rear wheels of the vehicle. A power supplying and/or absorbing unit such as an electric motor is coupled to each roll. In addition, a force transducer and speed sensor is coupled to each roll for providing signals representative of (a) the forces imported to or received by the rolls from the vehicle wheels minus the forces attributed to the parasitic losses of the rolls and (b) the speed of the rolls. Elements are also included for providing signals representative of the desired vehicle inertia and the forces attributable to the parasitic losses of the rolls. A system controller in response to the above signals controls the power supplying and/or absorbing units in accordance with:

$$V_d = \int_0^t \frac{(F_T + PL_T - RL)}{I} dt$$

where:
$V_d$ = the desired velocity of the driven and driving rolls;
$F_T$ = the total of the force signals associated with the driven roll or rolls;
$PL_T$ = the total of the parasitic loss signals associated with each driven roll;
$RL$ = the road load signal; and
$I$ = the desired vehicle inertia signal.

32 Claims, 6 Drawing Sheets

METHOD AND APPARATUS FOR ENABLING TWO OR FOUR WHEEL DRIVE VEHICLES TO BE TESTED UNDER SIMULATED ROAD CONDITIONS

BACKGROUND OF THE INVENTION

1. Field of the Invention

This invention relates to an apparatus and method for testing both two and four wheel drive vehicles (2 WD and 4 WD, respectively) having a variety of drive train configurations under anticipated road conditions.

2. Description of the Prior Art

Test apparatus in the form of dynamometers is widely used for testing motor vehicles in place. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = A + BV + CV^2 + DV^3 + EW$$

where A represents the effects of breakaway force, and, B, C and D represent the effects of rolling friction and windage, V represents the vehicle velocity, E represents the grade of the slope, and W represents the vehicle weight.

The purpose of the dynamometer is to impose those forces on the vehicle which the vehicle would incur during actual operation on a road. Dynamometers for 2 WD vehicles (front or rear axle drive) include a roll (or a pair of rolls) for engaging the driven wheels of the vehicle being tested. Prior art dynamometers for 4 WD vehicles (front and rear axles coupled to the engine) generally include a roll or pair of rolls for supporting and engaging each pair of wheels (front and rear) with the rolls being mechanically connected so that all of the rolls rotate at the same speed.

Typically a power supplying and absorbing unit such as an electric motor (a.c. or d.c.) or a power absorbing unit such as a friction brake, eddy current brake or hydrokinetic brake is coupled to the roll or rolls for supplying power to and/or absorbing power from the roll(s) which in turn applies a retarding force to the surface of the vehicle wheels (e.g., tires) to simulate the road load forces. Inertial forces can be simulated by power supplying and absorbing units during both acceleration and deceleration but can be simulated by power absorbing units only during acceleration. Mechanical flywheels are generally used in conjunction with power supplying and/or absorbing units to simulate a part (or in some instances all) of the vehicle inertia. Vehicle velocity may be determined from the formula:

$$V_1 - V_0 = \int_{t_0}^{t_1} \frac{F - RL}{I} dt$$

where $V_1$=the computed velocity at time $t_1$, $V_o$=the velocity at time $t_o$, F=the measured force at the roll interface, I=the desired vehicle inertia and RL=the road load force. The implementation of this basic equation to control the operation of a dynamometer is explained in some detail in U.S. Pat. No. 4,161,116 assigned to the assignee of this application.

The rotational velocity of the roll is representative of V and can be accurately measured by coupling a speed encoder of the optical or magnetic pulse type to the dynamometer roll. However, there is no force measuring device which as a practical matter, can be placed between the rotating vehicle wheel and the roll. As a compromise, a force measuring device or transducer is generally placed either at the output of the power supplying and/or absorbing unit or between the flywheel assembly and the shaft connecting the flywheels to the roll. In either case, there are bearing friction and windage losses generated by the roll and/or flywheels which are not measured by the transducer. Such losses are commonly referred to as parasitic losses and must be compensated for in order to provide an accurate control signal for the power supplying and/or absorbing unit in the dynamometer.

A parasitic loss profile or curve of the lost force at the roll surface (due to parasitic losses) versus roll speed for the roll can be computed by measuring the force required to maintain the roll or rolls at several selected (e.g., three) speeds. Such a loss profile can also be calculated by using the actual inertia of the roll system and allowing the roll (or rolls) to coast down from a high speed while measuring the change of roll speed at selected points on the speed curve. A signal representative of the forces attributable to parasitic losses can then be added to the force signal measured by the transducer to provide a force signal representative of F.

This arrangement is satisfactory for testing 2 WD or 4 WD vehicles where all of the wheels engaging the rolls are positively driven by the vehicle engine. However, dynamometers for 2 WD vehicles cannot be used to test 4 WD vehicles for obvious reasons and prior art dynamometers designed for 4 WD vehicles cannot readily be used to test 2 WD vehicles because the measured force will include a force required to turn the non-driven wheels. This force, required to push or pull the passive wheels, is already included in the road load force with the result that the use of the above equation for controlling the dynamometer is compromised. The same problem exists in testing some 4 WD vehicles even on the prior art dynamometers designed for 4 WD provide a viscous vehicles. Many modern 4 WD vehicles provide a viscous coupling arrangement between one of the axles and the engine whereby power is supplied to the viscous coupled axle only when the two axles (front and rear) are turning at different speeds. Where all four wheels are turning at the same velocity e.g., on a test dynamometer, the force required to rotate the wheels on the viscous coupled axle will be included twice i.e., in the measured force F and RL.

There is a need for a versatile dynamometer apparatus and method for testing both 2 WD vehicles and 4 WD vehicles with various engine/axle coupling arrangements.

SUMMARY OF THE INVENTION

In accordance with the present invention a dynamometer apparatus for testing both 2 WD and 4 WD vehicles under simulated road conditions includes at least a front and a rear roll for engaging the front and rear wheels of the vehicle, respectively. Front and rear power supplying and/or absorbing units such as electric motors are connected to the front and rear rolls. Front and rear force sensing means are coupled to the front and rear rolls, respectively, to provide force signals which are representative of the forces supplied to or received from the vehicle wheels by the associated roll minus the forces attributable to the parasitic losses associated with the respective roll.

Front and rear velocity sensing means are coupled to the front and rear rolls for providing signals which are representative of the speed of the rolls. The apparatus further includes inertia and road load signal generators for providing signals which represent the simulated inertia and road load forces of the vehicle being tested. In addition, means are provided for generating parasitic loss signals which represent the forces attributable to the parasitic losses of the dynamometer components associated with the front and rear rolls.

A system controller responsive to the above signals controls the power supplying and/or absorbing units in accordance with the following equation:

$$V_d = \int_0^t \frac{(F_T + PL_T) - RL}{I} dt$$

where:

$V_d$ = the desired velocity of the driven and driving rolls;

$F_T$ = the total of the force signals associated with the driven roll or rolls;

$PL_T$ = the total of the parasitic loss signals associated with each driven roll;

RL = the road load signal; and

I = the desired vehicle inertia signal.

The features of the present invention can be best understood by reference to the following description taken in conjunction with the accompanying drawings wherein like reference numerals indicate like components.

DESCRIPTION OF THE PREFERRED EMBODIMENT

Figure 1:
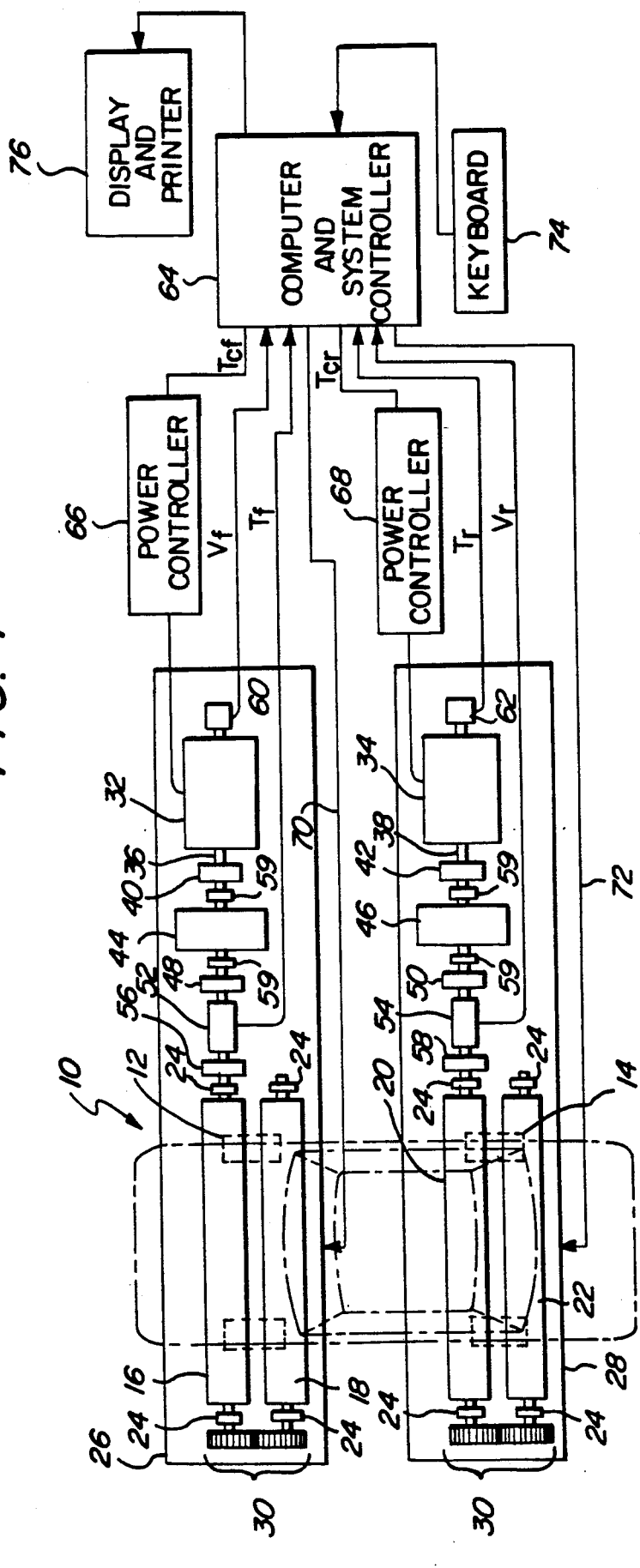
FIG. 1 is a diagrammatic plan view of a dynamometer apparatus in accordance with the present invention.

Referring now to the drawings and particularly FIG. 1, there is illustrated a dynamometer apparatus for testing a 4 WD vehicle 10 having front and rear wheels 12 and 14. The front wheels are cradled between front drive and idle rolls 16 and 18 (i.e., front roll set) and the rear wheels are cradled between rear drive and idle rolls 20 and 22 (i.e. rear roll set) in a conventional manner. Bearings 24 support all four rolls on frames 26 and 28 with the rear frame 28 being moveable along an axis perpendicular to the roll axis toward and away from the front frame 26 to accommodate vehicles of different length wheel bases. Each pair of rolls (i.e., front and rear) may be coupled through gearing 30 or some other means to rotate in unison. Front and rear power supplying and absorbing units 32 and 34 in the form of electric motors (a.c. or d.c.) are connected to the respective drive rolls through shafts 36, 38, flexible couplings 40, 42, mechanical flywheels 44,46, flexible couplings 48, 50, torque transducers (52-front and 54-rear) and flexible couplings 56 and 58 as shown. Bearings 59 support the flywheels 44 and 46. Front and rear velocity encoders 60 and 62 are coupled to the front and rear drive roll shafts 36 and 38 for generating signals representative of the speed of the associated roll.

The front and/or rear vehicle wheels are raised above or lowered into the rolls by conventional means such as electrically actuated hydraulic lifts.

Signals from the torque transducers 52, 54 and the velocity encoders 60, 62 are supplied to a computer and system controller 64 which in turn supplies torque command signals to front and rear power controllers 66 and 68 The power controllers in response to the torque command signals control the motors 32 and 34 to supply power to or absorb power from the respective drive rolls. For example, where d.c. motors are used, the power controllers adjust the armature current to cause motors to drive or brake the drive rolls. The computer 64 also controls the wheel lift and roll brake mechanisms through leads 70 and 72.

A keyboard 74 is connected to the computer 64 to allow an operator to input the inertia and road load forces for the vehicle being tested as well as make certain vehicle characteristic inputs such as 2 WD or 4 WD viscous or positive power split drive between axles as will be described in more detail in conjunction with FIG. 3 A video display and printer 76 allows the operator to display or printout test information in a conventional manner.

Figure 2A:
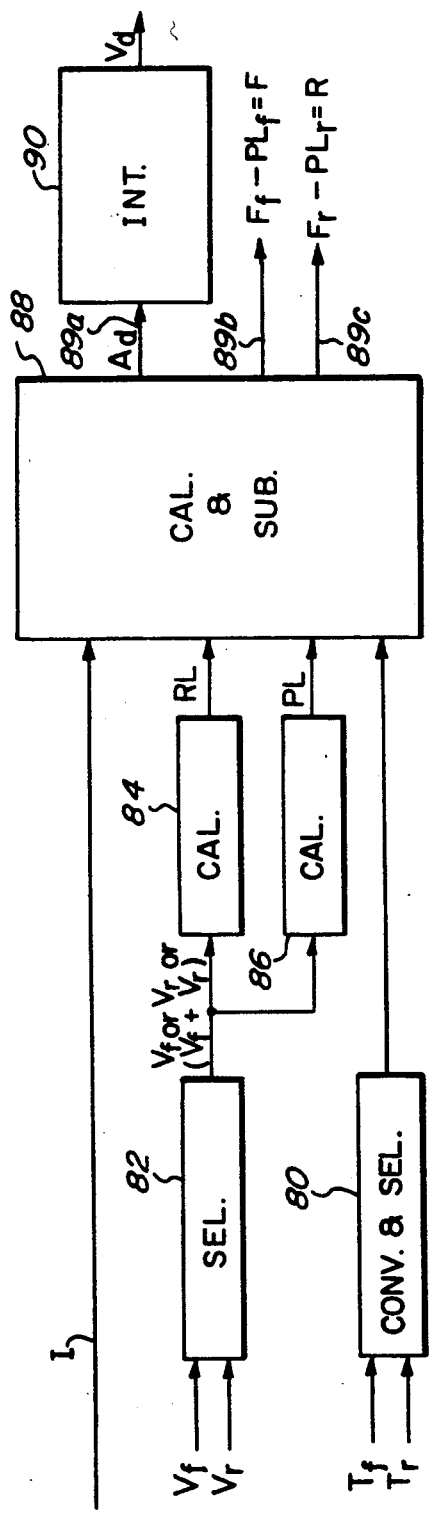
FIGS. 2a and b are block diagrams of the signal flow for deriving the desired velocity for the roll(s) and the torque command(s) for the power supplying and/or absorbing unit(s)

FIGS. 2a and b illustrate circuitry within the computer 64 which calculates the desired velocity ($V_d$) of the dynamometer roll or rolls and utilizes that signal to provide a torque command signal $T_c$ which is supplied to the front and/or rear power controllers 66 and 68.

A converter and selection circuit 80 converts the measured front and rear roll torque signals $T_f$ and $T_r$ from the sensors 52 and 54 into signals representative of the measured force signals $F_f$ and $F_r$ delivered to or received from the front and rear drive rolls, respectively, by the vehicle wheels minus the associated parasitic losses.

The circuit 80 also selects the particular force signal ($F_f$ or $F_r$) or force signals ($F_f$ and $F_r$) which are to be used by the computer to calculate the desired speed or speeds of the drive roll or rolls as will be explained in more detail in conjunction with FIG. 3. The output signal from the circuit 80 represents the total force ($F_T$) delivered to or received from the drive rolls by the vehicle wheels being driven by the vehicle engine minus the total of the forces attributable to the parasitic losses of such rolls.

A selector circuit 82 selects the speed signal $V_f$ or $V_r$ or $V_f$ and $V_r$, representative of the speed of the drive roll or rolls which are being driven by the vehicle wheels.

A road load force calculating circuit 84 calculates the force attributable to the vehicle road load forces in accordance with the equation discussed previously, i.e., $RL = A + BV + CV^2 + DV^3 + EW$ where V represents the speed of the roll being driven by the vehicle ($V_f$ or $V_r$) or preferably an average of the speed of the front and rear drive rolls $$\frac{(V_f + V_r)}{2}$$

where both rolls are being driven.

A parasitic loss signal generator 86 responds to the selected drive roll speed signal or signals and a parasitic loss profile signal (stored in the computer) for the front (16, 18) and rear (20, 22) roll sets and generates a parasitic loss signal representative of the forces attributable to the parasitic losses of the front ($PL_f$) and/or rear ($PL_r$) drive roll sets in accordance with:

$$PL_f = a + bV_f + cV_f^2 + dV_f^3 + I_f dV_f/dt$$

$$PL_r = a + bV_r + cV_r^2 + dV_r^3 + I_r dV_r/dt;$$

where: a, b, c, and d are constants which represent static frictional, rolling frictional and windage forces on the respective rolls;
$I_f$ = the inertia of the front roll set;
$I_r$ = the inertia of the rear roll set;
$dV_f/dt$ and $dV_r/dt$ = the acceleration rates(s) of the respective roll(s).

The output signal from the circuit 86 represents the total of the parasitic losses ($PL_T$) attributable to the roll sets which are being driven by the vehicle wheels.

An acceleration signal generating circuit 88 responds to a selected simulated inertia signal I for the vehicle and to RL, $PL_T$ and $F_T$ and calculates the desired acceleration, Ad, in accordance with:

$$Ad = \frac{F_T + PL_T - RL}{I}$$

The desired acceleration signal is outputted on lead 89a to an integrating circuit 90 which integrates Ad to produce a desired velocity signal $V_d$. The desired or calculated acceleration signal is also supplied to parasitic loss signal generator 86 where it functions as the derivative of velocity term i.e., $dV_f/dt$ or $dV_r/dt$. The signal generating circuit 88 also supplies on output leads 89b and 89c front and rear drive roll force signals compensated for parasitic losses i.e., $F = F_f - PL_f$ for the front roll and $R = F_R - PL_r$ for the rear roll. The use of such signals is explained in conjunction with FIG. 4.

Figure 2B:
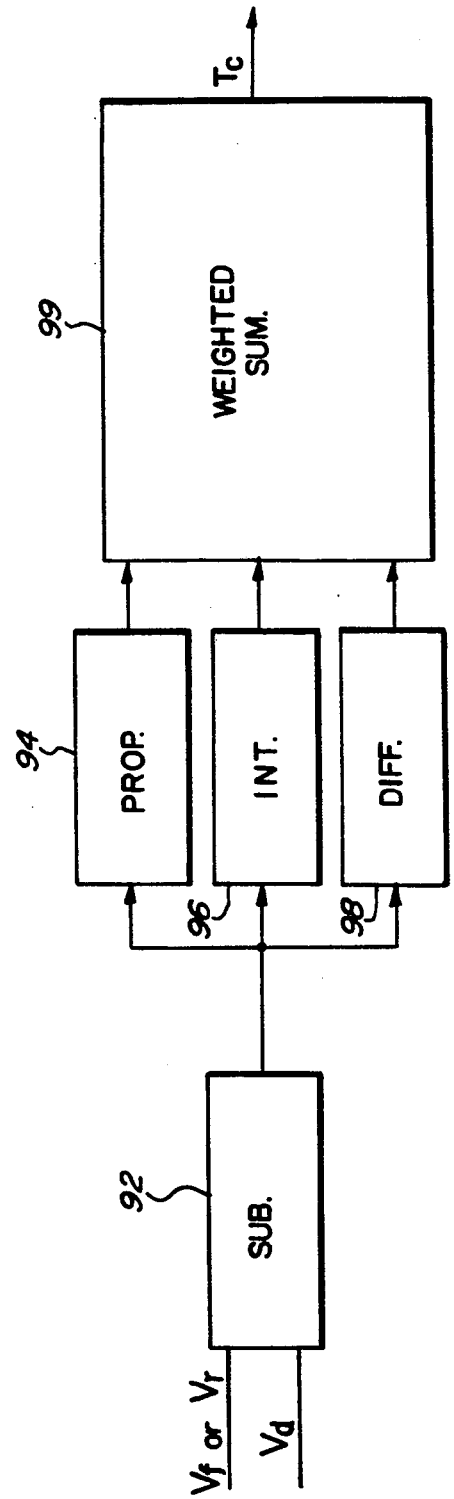
FIG. 2 (including parts a and b) is a flow chart illustrating the method of operation of the apparatus of FIG. 1.

The circuits for producing torque command signals $T_{cf}$ and $T_{cr}$ for the power controllers 66 and 68 are identical and one such conventional PID controller circuit is shown in FIG. 2b. A subtractor circuit 92 determines the velocity error signal by subtracting $V_a$ (achieved velocity, $V_f$ or $V_r$) from the $V_d$ (desired roll velocity) and produces a velocity error signal $V_e$. The error signal is supplied to a proportional circuit 94, an integrating circuit 96 and a differentiating circuit 98. A weighted summation circuit 99 provides a torque command signal in accordance with:

$$T_c = K_1 V_e + K_2 \int_o^t V_e \, dt + K_3 \, dV_e/dt$$

where $K_1$, $K_2$, and $K_3$ are constants.

Figure 3:
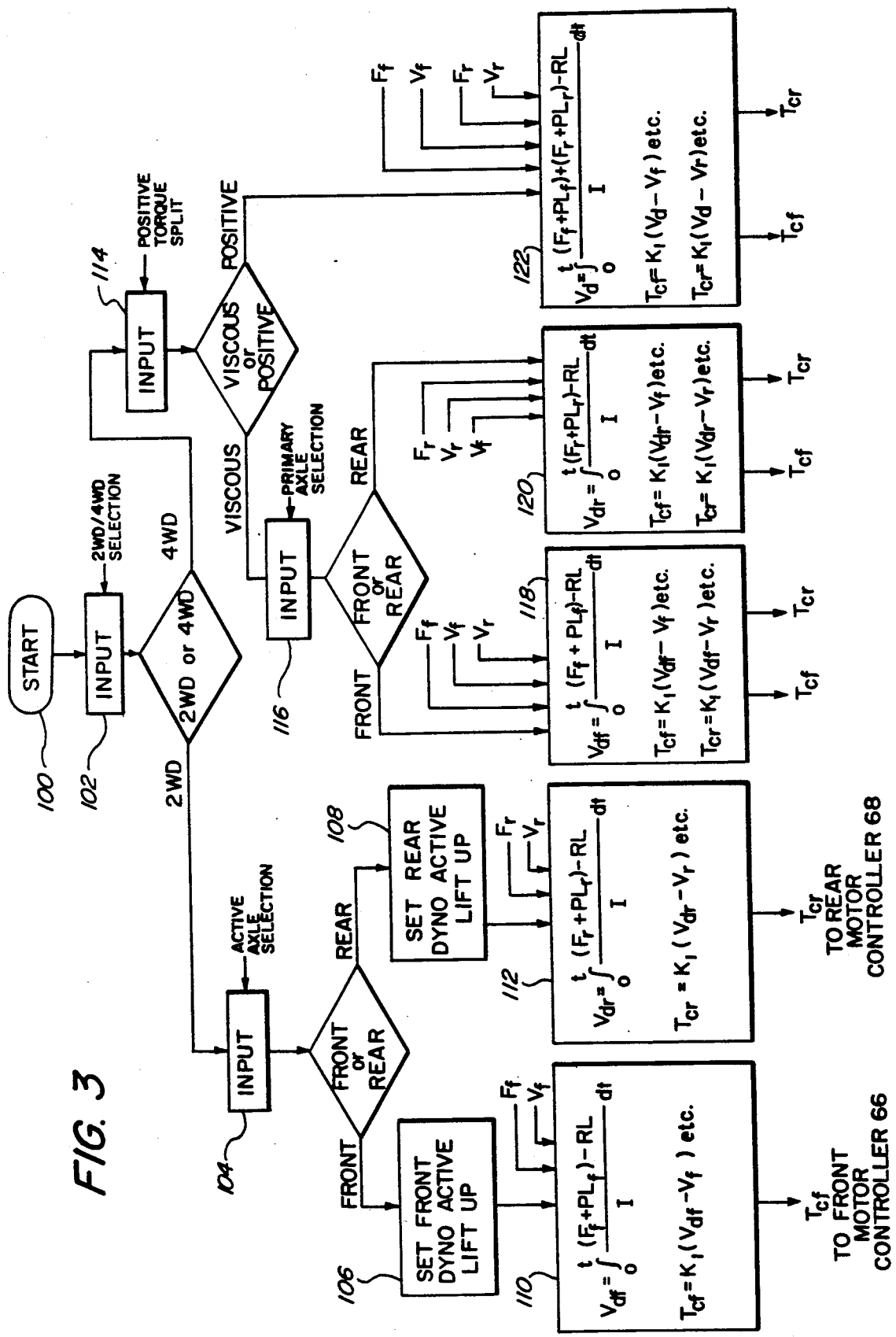
FIG. 3 is a flow chart illustrating the operation of the dynamometer apparatus of FIG. 1.

FIG. 3 illustrates the operation of the dynamometer apparatus of FIG. 1 in simulating the inertial and road load forces for 2 WD and 4 WD vehicles. To start the operation (block 100) the vehicle is driven onto the dynamometer rolls. The operator inputs the type of vehicle, i.e., 2 WD or 4 WD, into the computer/controller 64 (block 102) via the keyboard 74.

If a 2 WD vehicle is to be tested, the operator selects (block 104) the driven or active axle (front or rear). The computer then activates the brake for the roll set beneath the inactive wheels via leads 70 and 72 (FIG. 1).

Where the front wheels are the driven wheels then the $F_f$ and $V_f$ signals are selected and processed by the computer circuitry of FIG. 2a to provide a desired velocity signal $V_{df}$ for the front drive roll as is illustrated by block 110 in FIG. 3. The achieved velocity signal of the front drive roll $V_f$ is then subtracted from $V_{df}$ and the error signal $V_{ef}$ utilized to provide a front controller torque command signal $T_{cf}$ by the circuitry of FIG. 2b.

Where the test vehicle's rear wheels are the driven wheels the $F_r$ and $V_r$ signals are selected and a desired velocity signal $V_{dr}$ and torque command signal $T_{cr}$ for the rear drive roll are generated as is illustrated by block 112 of FIG. 3.

If a 4 WD vehicle is to be tested then the operator selects the type of vehicle drive system (block 114) i.e., whether both axles (front and rear wheels) are positively driven or one axle is positively driven and the other axle is coupled through a non-continuous split drive arrangement in which one axle may not receive power under certain conditions. As an example, some 4 WD vehicles have one of the axles (front or rear) coupled to the engine through a viscous drive arrangement so that the viscous coupled axle receives power only when both axles are not rotating at the same speed e.g., front and rear wheels having different traction with the road bed. For sake of simplicity, such a drive train arrangement is referred to herein as viscous coupled.

Where the vehicle drive train includes a viscous type coupling the operator selects the primary driven axle (block 116) for the test vehicle. When the front axle is selected the roll velocity and torque command signals $V_{df}$ and $T_{cf}$ are calculated in the same manner as for 2 WD vehicles with the front axle being driven. See blocks 110 and 118. Since the front and rear wheels must rotate at the same speed for 4 WD vehicles, a torque command signal is also generated for the rear power controller 68 i.e.,:

$$T_{cr} = K_1(V_{df} - V_r) + K_2 \int_o^t V_{df} - V_r + K_3 \, d(V_{df} - V_r)/dt$$

When the rear axle is selected the roll velocity and torque command signals $V_{dr}$ and $T_{cr}$ are calculated in the same manner as for a 2 WD vehicle with the rear axle being driven. See blocks 112 and 120. In this case a torque command signal is also generated for the front power controller 66 as previously explained with respect to block 118 except that $V_{dr}$ and $V_f$ are supplied to the PID controller, 94–99 of FIG. 2b.

The selection for a positive torque split vehicle results in a different computation of the desired velocity As is illustrated by block 122, the desired drive roll velocity $V_d$ for both drive rolls is computed by adding the front and rear measured force signals (i.e., $F_f$ and $F_r$) to obtain the total force signal $F_T$ representative of the sum of the forces delivered to or received by the drive rolls from the vehicle wheels minus the associated parasitic losses as previously discussed. The parasitic loss signals for both roll sets are also added to obtain a total parasitic loss signal ($PL_T$) as is illustrated by block 122. Since the front and rear drive rolls may not rotate at the same speed during transient conditions, the speed signal ($V_a$) used to derive the RL force attributable to simulated road load forces may be based on an average of the front and rear roll drive speeds as discussed previously in conjunction with FIG. 2.

Certain 4 WD vehicles have drive trains which automatically change the engine power split between axles operating at the same speed during the operation of the vehicle. For example, the engine may (1) drive only one axle (e.g., rear wheels) during acceleration from zero to a first predetermined speed, (2) drive both axles during an additional acceleration phase and (3) drive only the other axle (e.g. front wheels) during constant speed operation once a second predetermined speed is achieved.

Figure 4:
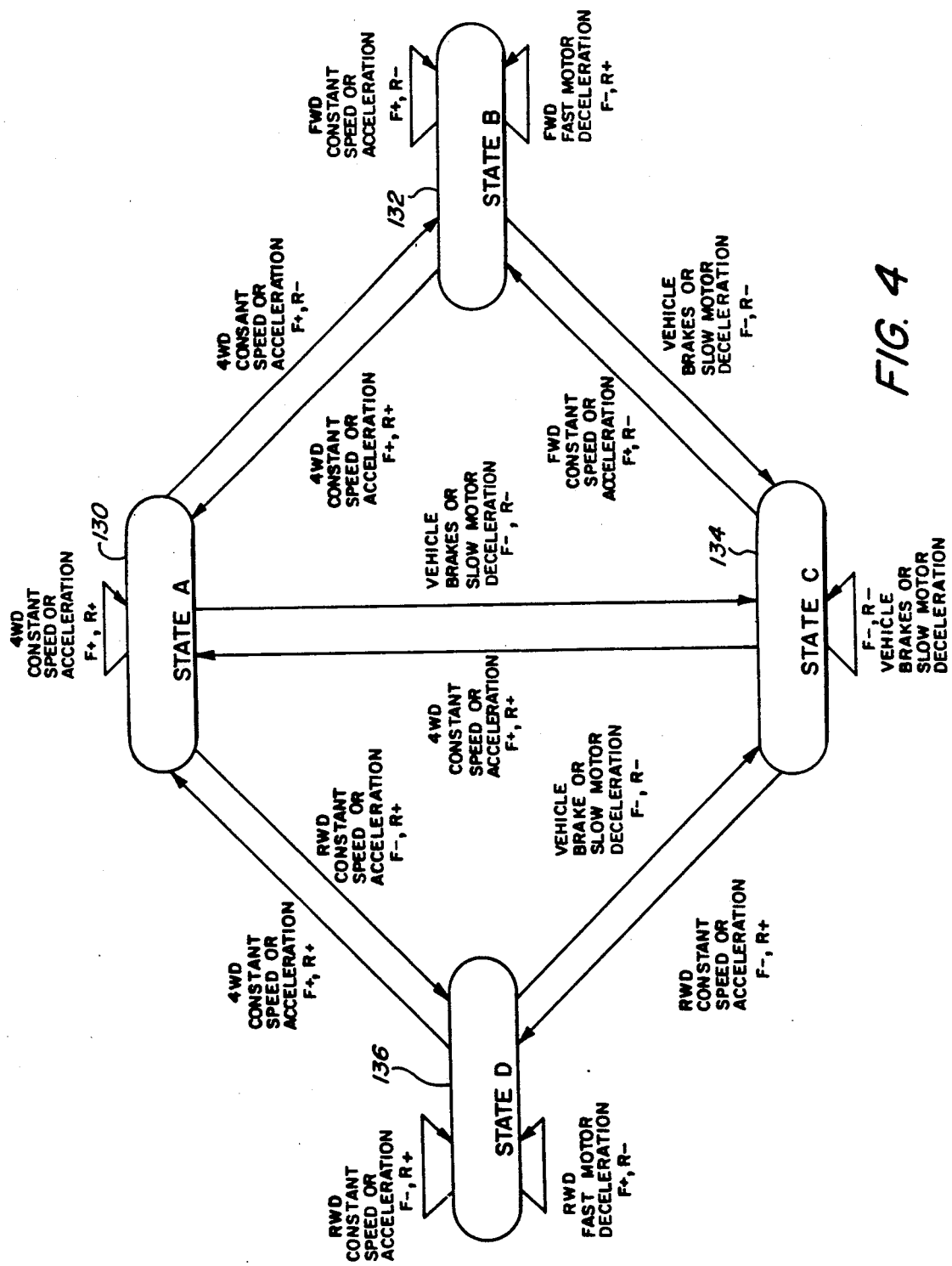
FIG. 4 is a bubble diagram illustrating the method of determining the force and parasitic loss signals to be used in controlling the speed of the dynamometer roll(s)

During the time that only one axle and its associated wheels are being driven, the equations of block 118 or 120, depending upon the particular axle that is being driven (front or rear), should be used to provide accurate torque command signals. During the time that both axles are being driven, $T_{cf}$ and $T_{cr}$ should be derived from the equations of block 122. FIG. 4 illustrates the steps required to enable the computer 64 to determine which set of equations to apply under these conditions.

Where the resultant force signals on the front and rear rolls, F and R, derived from the circuit 88 of FIG. 2 have the same sign (i.e., both drive rolls receiving power from or delivering power to the wheels) the computer follows the equations of block 122 to derive the torque command signals. On the other hand where the force signals have different signs (i.e., one drive roll delivering power and one receiving power) the computer follows the equation of block 118 or 120 in FIG. 3. To enable the computer to determine whether the vehicle is behaving in a front or rear axle drive mode when the signs of the force signals are different the history of the vehicle operation must be known. FIG. 4 illustrates four possible vehicle operational states.

State A, designated 130, represents a constant speed or acceleration mode with all four wheels being driven, i.e., F+ and R+. State B, designated 132, represents a front wheel drive mode in which (1) the front wheels are driving the roll 16 and the rear wheels are being driven by the roll 18 during constant speed operation or acceleration, i.e., F+ and R−, and (2) the front wheels being driven by the roll 16 and the rear wheels driving the roll 18 during fast motor deceleration, i.e., F− and R+. In the latter situation the inertia of the front roll 16 (and its associated components) drives the front wheels against the retarding force of the engine while the inertia of the rear wheels tries to maintain the speed of the decelerating rear roll 22.

State C, designated 134, represents a vehicle at rest, i.e., F=0, R=0 or a vehicle with the drive rolls 16 and 20 driving all four vehicle wheels during slow motor deceleration, i.e., F−, R−.

State D, designated 136, represents a rear wheel drive mode in which (1) the rear wheels are driving the roll 18 and the front wheels are being driven by the roll 16 during constant speed operation or acceleration, i.e., F− and R+ and (2) the rear wheels are being driven by the roll 18 and the front wheels driving the roll 16 during fast motor deceleration, i.e., F+ and R−.

When the vehicle is operating in states A and C the computer follows the equations of block 122 to derive the torque command signals $T_{cf}$ and $T_{cr}$. When the vehicle is operating in states B and D the computer follows the equation of blocks 118 and 120, respectively, to derive $T_{cf}$ and $T_{cr}$.

Consider, for example, a vehicle beginning its test and accelerating to given speed, i.e., from state C. The signs of F and R determine whether the vehicle is to be treated as operating in state D, (F−, R+) or state B (F+, R−) or state A (F+, R+). A vehicle which had been operating in state C and accelerates or runs at constant speed in which F and R are both positive is treated as operating in state A, etc.

The computer tracks the past and current operation of the vehicle as indicated by the arrows on FIG. 4 and applies the correct equation as designated by blocks 118, 120 and 122 in FIG. 2, to provide the correct torque command signals for the power controllers 66 and 68 which in turn control the power supplying and/or absorbing units 32 and 34.

The units 32 and 34 in conjunction with the flywheel and roll assemblies cause the drive roll or rolls to apply a braking or driving force to the vehicle wheels to simulate the vehicle inertia and road load forces. Thus, the vehicle engine (or brakes) experience the same load that it would incur under actual operation on the road. Such dynamometer apparatus allows manufacturers and governmental agencies to conveniently determine whether vehicles meet required standards of performances such as fuel consumption and emission levels.

It should be noted that by following the steps of FIG. 4 the computer automatically makes the selections indicated by blocks 114 and 116 of FIG. 3.

Figure 5:
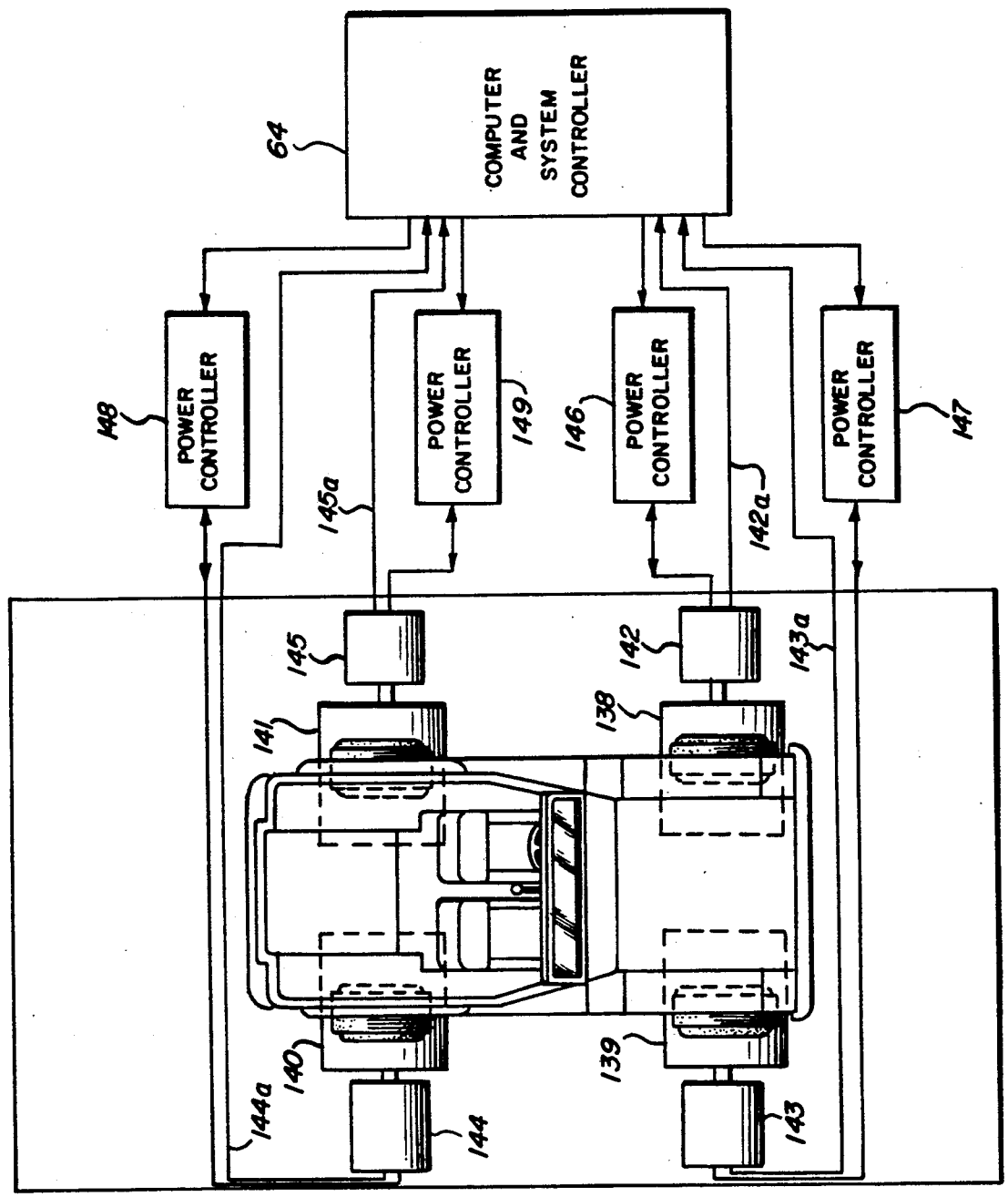
FIG. 5 is a diagrammatic plan view of a dynamometer apparatus for testing motor vehicles in which individual wheels are independently and positively driven by the vehicle engine.
Figure 6:
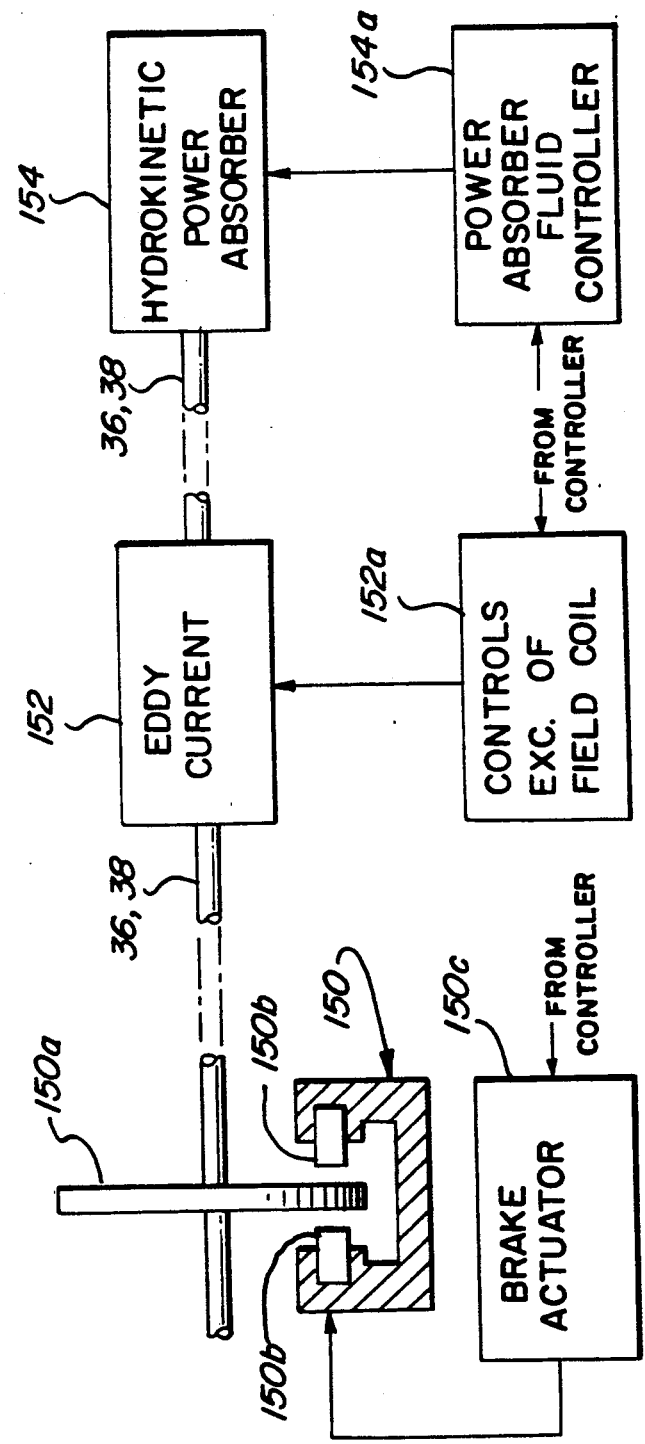
FIG. 6 is a block diagram of three power absorbing units which may be used in place of the power supplying and/or absorbing units illustrated in FIG. 1.

Referring now to FIG. 5, there is illustrated a dynamometer apparatus for testing four wheel motor vehicles in which two or four of the wheels are individually and positively driven by the vehicle engine The apparatus includes separate drive rolls 138, 139, 140 and 141 which engage the left front, right front, right rear and left rear wheels of the vehicle, respectively. While only single drive rolls are illustrated in FIG. 5, it is to be understood that idler rolls may be included if desired. Reference numerals 142, 143, 144 and 145 designate combined power supplying and/or absorbing units (e.g., d.c. motors), torque transducers and velocity encoders. Leads 142a, 143a, 144a and 145a carry (1) torque signals representative of the torque applied to or received from the respective roll and (2) velocity signals representative of the speed of the respective roll.

The signals are supplied to the computer and system controller 64. The computer 64 supplies torque command signals to power controller 146, 147, 148 and 149 which in turn control the motors 142–145. Each drive roll, motor, power controller and associated torque and speed transducers may be classified as a separate dynamometer. The computer 64 in response to the torque signals, from the separate dynamometer units, generates force signals $F_{fl}$, $F_{fr}$, $F_{rr}$ and $F_{rl}$ representative of the forces imparted to or by the front left, front right, rear right and rear left rolls, 138, 139, 140, and 141, respectively, minus the roll parasitic loss forces. The velocity sensors produce drive roll speed signals $V_{re}$, $V_{fr}$, $V_{rr}$ and $V_{rl}$ representative of the speed of the front left, front right, rear right and rear left rolls, respectively. The desired speed $V_d$ of each roll that is being driven or driving a wheel is determined in the computer by:

$$V_d = \int_o^t \frac{(F_T + PL_T) - RL}{I} dt$$

where:

$F_T$ = the sum of the force signals associated with the rolls being driven by the vehicle engine.

$PL_T$ = the sum of the parasitic loss signals associated with the rolls being driven by the vehicle engine.

RL and I = the road load force and desired vehicle inertia as discussed previously.

For example, where only two of the wheels (e.g., front wheels) are being independently and positively driven by the engine $F_T$ would equal $F_{fr} + F_{fl}$ and $PL_T$ would equal the sum of the forces attributable to the parasitic losses of rolls 138 and 139. Where all four wheels are being driven by the engine then $F_T$ and $PL_T$ would equal the sum of the force signals and parasitic loss signals associated with all four rolls.

Electric motors are most often used in dynamometers which are designed to simulate vehicle inertia because of their ability to simulate inertia during both acceleration and deceleration. However, where there is a need to simulate inertia only during acceleration, power absorbing units such as those illustrated in FIG. 5 may be used in place of (or perhaps in addition to) the electric motors 32 and 34 of FIG. 1.

The power absorbers depicted in FIG. 5 include a mechanical friction brake 150, an eddy current brake 152, a hydrokinetic power absorber 154. The mechanical friction brake 150 includes a rotating disc 150a coupled to the drive roll shaft 36 or 38 and a pair of brake pucks 150b which are forced against the disc by a conventional electromagnetic, hydraulic/pneumatic actuator 150c in response to the control signal from the controller 166 or 168.

The eddy current power absorption unit 152 may be of the conventional type, for example, of the type supplied by Dyamic Corporation of Kenosha, Wisc. and described in that company's bulletin DB-1 published in November of 1953. In principle, an eddy current brake dynamometer absorbs power which varies with the excitation of the field coils and speed. Field excitation for the coils will be supplied from the controller 140.

The hydrokinetic power absorber 154 may be of the type described in U.S. Pat. No. 2,870,875. In this type of absorber the absorbed power follows substantially a cubed curve with changes in speed and a given level of fill of working fluid such as water. A power absorber fluid controller 154a adds fluid to or removes fluid from the absorber in accordance with a control signal from the controller 166 or 168 in a manner well known to those skilled in the art to cause the absorber to increase or decrease the power being absorbed from the drive roll shaft.

There has been described a novel dynamometer apparatus and method for simulating the inertia and road load forces for motor vehicles having a variety of drive train arrangements, e.g., 2 WD and 4 WD. The apparatus and method may be used with 4 WD vehicles in which all four wheels are positively driven or in which two of the wheels are positively driven only under certain conditions. The apparatus and method may also be used with two wheel vehicles such as motorcycles in which one or both wheels are driven.

Various modifications of the apparatus or a variation in the method steps will occur to persons skilled in the art. For example, in testing 4 WD off-road vehicles in which the rear wheels are driven at a slightly greater speed than the front wheels, the integrating portion 96 of the PID controller may be deactivated with respect to the front or rear axle velocity signals to allow the rear wheels to travel a slightly greater distance than the front wheels. The velocity signal used to provide the parasitic loss signal where both drive rolls of FIG. 1 are being driven may be either $V_f$ or $V_r$ instead of an average of such signals.

It is, of course, not necessary to program the computer to follow the directions of FIG. 4 where the 4 WD vehicles to be tested do not have the capability of changing the power transferred to the two axles operating at the same speed, i.e., from 0 to a finite percentage. Also, such programming may not b necessary where the time during which one or both axles (normally being positively driven) receives 0% power is small compared to the overall test period so that the resultant error is acceptable. These and other modifications are possible without involving any departure from the spirit and scope of the present invention as set forth in the appended claims.

It should be noted that the terms "driven roll or rolls" or "roll or rolls being driven by the vehicle" (or like terms) as used in the claims shall mean the roll or rolls which are driven by the vehicle at least during acceleration and constant speed operation. It is to be understood that such rolls will transfer power to (or drive) the vehicle wheels during braking and motor deceleration.

By the same token, the terms "driving roll" or "roll driving the vehicle wheels" (or like terms) as used in the claims shall mean the roll (or rolls), if any, which is driving the vehicle wheels at least during acceleration and constant speed operation. Such rolls will receive power from (or be driven by) the vehicle wheels during braking and motor deceleration.

What is claimed is:

1. A dynamometer apparatus for simulating the inertia and road load for motor vehicles having at least one front and one rear wheel with the front and/or rear wheels being driven, comprising:
   at least one front roll for engaging the front wheel of the vehicle;
   at least one rear roll for engaging the rear wheel of the vehicle;
   front and rear power supplying and/or absorbing units connected to the front and rear rolls, respectively, each unit being arranged to supply power to and/or absorb power from the associated roll, each roll applying a force to or receiving a force from the associated wheel in accordance with the supplied or absorbed power;

front and rear force sensing means coupled to the front and rear rolls, respectively, each force sensing means being arranged to provide a force signal which is a function of the force supplied to or received from the vehicle wheel by the associated roll minus the force attributable to the parasitic losses associated with said roll;

front and rear velocity sensing means coupled to the front and rear rolls, respectively, each velocity sensing means being arranged to provide a measured speed signal which is a function of the speed of each associated roll;

means for generating an inertia signal which is a function of the force attributable to the simulated inertia of the vehicle being tested;

means for generating a road load signal which is a function of the road load forces for the vehicle;

means for generating front and rear roll parasitic loss signals which are functions of the forces attributable to the parasitic losses of the dynamometer components associated with the front and rear rolls, respectively; and control means responsive to the velocity signals from the front and rear velocity sensing means, the force signals from the front and rear force sensing means, the parasitic loss signals associated with the front and rear rolls, the inertia signal and the road load signal for controlling the front and/or rear power supplying and/or absorbing units in accordance with:

$$V_d = \int_o^t \frac{(F_T - PL_T) - RL}{I} dt$$

where:

$V_d$ = the desired velocity of the driven and driving roll or rolls;

$F_T$ = the total of the force signals from the force sensing means coupled to the rolls which are driven by the vehicle;

$PL_T$ = the total of the parasitic loss signals associated with each roll being driven by the vehicle;

$RL$ = the road load signal; and $I$ = the inertia signal.

2. The invention of claim 1 wherein the control means includes means responsive to the desired velocity signal and to measured speed signal of each roll which is driving or being driven by the associated vehicle wheel for generating an error speed signal for each driving and driven roll.

3. The invention of claim 1 wherein the control means further includes means responsive to each error speed signal for controlling the power supplying and/or absorbing unit coupled to each driving or driven roll to reduce the associated error signal toward zero.

4. The invention of claim 3 wherein the road load signal generating means is responsive to the measured speed signal of the driven roll or rolls and provides a road load signal in accordance with:

$$RL = A + BV_s + CV_s^2 + DV_s^3 + EW$$

where:

$RL$ = the road load signal;

$V_s$ = the measured speed signal of a selected roll being driven by the vehicle wheels; and $W$ = the vehicle weight; and $A, B, C, D$ and $E$ are constants.

5. The invention of claim 4 wherein $V_s$ is equal to the measured speed signal of the driven roll or the average of the measured speed signals of both rolls when driven.

6. The invention of claim 4 wherein the parasitic loss signal generating means in response to the measured speed signals of the rolls provides a parasitic loss signal for the front and rear rolls in accordance with:

$$PL_f = a + b\ V_f + cV_f^2 + dV_f^3 + I_f \underline{dV_f}/dt$$

$$PL_r = a + b\ V_r + cV_r^2 + dV_r^3 + I_r \underline{dV_r}/dt$$

where:

$I_f$ = the inertia of the front roll;

$I_r$ = the inertia of the rear roll;

$PL_f$ = the parasitic loss signal for the front roll;

$PL_r$ = the parasitic loss signal for the rear roll;

$V_f$ = the measured speed signal of the front roll;

$V_r$ = the measure speed signal of the rear roll; and $a, b, c,$ and $d$ are constants.

7. The invention of claim 6 wherein the control means includes means for generating a desired acceleration signal for the driving roll or rolls and wherein the $\underline{dV/dt}$ term is the desired acceleration signal.

8. The invention of claim 1 wherein the control means further includes means for adding the associated parasitic loss signal to the measured speed signal for each roll and means for comparing the signs of the resultant signals to provide $F_T$.

9. The invention of claim 1 wherein the power supplying and/or absorbing unit is an electric motor.

10. The invention of claim 9 wherein said at least one front roll comprises a front drive roll and a front idler roll for cradling the front wheel of the vehicle wherein said at least one rear roll comprises a rear drive roll and a rear idler roll for cradling the rear wheel of the vehicle and wherein the parasitic losses for the front and rear idler rolls are included in $PL_f$ and $PL_r$, respectively.

11. The invention of claim 10 wherein the motor vehicle has a pair of front and a pair of rear wheels and wherein the front and rear drive and idler rolls cradle the vehicle front and rear wheels, respectively.

12. In a method of simulating the inertia and road load forces for two and four wheel drive vehicles on a dynamometer installation, the dynamometer installation including at least one front roll for engaging the front wheels of the vehicle, at least one rear roll for engaging the rear wheels of the vehicle, front and rear power supplying and/or absorbing units connected to the front and rear rolls, respectively, front and rear force sensing means for providing measured force signals representative of the forces applied to or received from the vehicle wheels by the front and rear rolls, respectively, minus the force attributable to the parasitic losses associated with the respective roll, velocity sensing means for providing signals representative of the speed of the front and rear rolls, respectively, inertia signal generating means for providing a signal representative of the simulated inertia for the vehicle under test, road load signal generating means for providing a road load signal representative of the road load forces of the vehicle under test, parasitic loss signal generating means for providing parasitic loss signals representative of the forces attributable to the parasitic losses of the front and rear rolls, respectively, the method comprising:

a) selecting which roll or rolls are to (1) be driven by the vehicle wheels, (2) drive the vehicle wheels or (3) remain idle;

b) actuating the power supplying and/or absorbing units which are coupled to the roll or rolls to be driven by or drive the vehicle wheels; and c) controlling the power supplying and/or absorbing units coupled to the roll or rolls selected in step a(1) and (2) to thereby control the speed of the roll or rolls in accordance with:

$$V_d = \int_0^t \frac{(F_T + PL_T) - RL}{I} dt$$

where
$V_d$ = the desired velocity of each driven and driving roll;
$F_T$ = the sum of the force signals associated with the driven roll or rolls;
$PL_T$ = the sum of the parasitic loss signals associated with the driven roll or rolls;
$RL$ = the road load signal; and
$I$ = the inertia signal.

13. The method of claim 12 wherein step (c) includes the steps of determining the difference between the desired velocity of the driven and driving rolls and the measured speed signals for said rolls and of controlling the power supplying and/or absorbing units to reduce said difference to a negligible value.

14. The method of claim 13 wherein the rear roll is selected in step a(1) and the front roll is selected in step a(3).

15. The method of claim 14 wherein $F_T$ of step (c) is equal to the measured force signal associated with the rear roll and $PL_T$ is equal to the parasitic loss signal associated with the rear roll.

16. The method of claim 13 wherein the front roll is selected in step a(1) and the rear roll is selected in step a(3).

17. The method of claim 16 wherein $F_T$ of step (c) is equal to measured force signal associated with the front roll and $PL_T$ is equal to the parasitic loss signal associated with the front roll.

18. The method of claim 13 wherein both rolls are selected in step (a) (1).

19. The method of claim 18 wherein $F_T$ of step (c) is equal to the sum of the measured force signal for both rolls and $PL_T$ is equal to the sum of the parasitic loss signals associated with both rolls.

20. The method of claim 13 wherein the rear roll is selected in step a(1) and the front roll is selected in step a(2).

21. The method of claim 20 wherein $F_T$ of step (c) is equal to the measured force signal associated with the rear roll and $PL_T$ is equal to the parasitic loss signal associated with the rear roll.

22. The method of claim 13 wherein the front roll is selected in step a(1) and the rear roll is selected in step a (2).

23. The method of claim 22 wherein $F_T$ of step (c) is equal to the measured force signal associated with the front roll and $PL_T$ is equal to the parasitic loss signal associated with the front roll.

24. The method of claim 19 wherein step c includes the steps of determining the desired acceleration of both rolls.

25. A dynamometer apparatus for simulating the inertia and road load for motor vehicles having front and rear wheels one or both of which are driven, comprising:

at least one front roll for engaging the front wheels of the vehicle;

at least one rear roll for engaging the rear wheels of the vehicle;

front and rear power supplying and/or absorbing units connected to the front and rear rolls, respectively, each unit being arranged to supply power to and/or absorb power from the associated roll, each roll applying a force to or receiving a force from the associated wheels in accordance with the supplied or absorbed power;

front and rear force sensing means coupled to the front and rear rolls, respectively, each force sensing means being arranged to provide a signal representative of the force supplied to or received from the vehicle wheels by the associated roll minus the force attributable to the parasitic losses of the associated roll;

front and rear velocity sensing means coupled to the front and rear rolls, respectively, each velocity sensing means being arranged to provide a signal representative of the speed of each associated roll;

means for generating an inertia signal representative of the desired inertia of the vehicle being tested;

means for generating a road load signal representative of the road load forces for the vehicle;

means for generating individual parasitic loss signals representative of the parasitic losses of the dynamometer components associated with the front and rear rolls; and control means responsive to the velocity signals, the force signals, the parasitic loss signals, the inertia signal, and the road load signal for controlling the power supplying and/or absorbing unit coupled to the front and rear rolls to adjust the speed of the rolls in accordance with:

$$V_{df} = \int_0^t \frac{(F_f + PL_f) - RL}{I} dt$$

or $$V_{dr} = \int_0^t \frac{(F_r + PL_r) - RL}{I} dt$$

or $$V_d = \int_0^t \frac{(F_f + PL_f) + (F_r + PL_r) - RL}{I} dt$$

where:
$V_{df}$ = the desired velocity of the driven and driving rolls when only the front roll is being driven by the vehicle front wheels;
$V_{dr}$ = the desired velocity of the driven and driving rolls when only the rear roll is being driven by the vehicle rear wheels;
$V_d$ = the desired velocity of the front and rear rolls when both rolls are being driven by the vehicle wheels;

$F_f$ = the front roll force signal;
$F_r$ = the rear roll force signal;
$PL_f$ = the front roll parasitic loss signal;
$PL_r$ = the rear roll parasitic loss signal;
RL = the road load signal; and
I = the inertia signal.

26. The invention of claim 24 wherein said at least one front roll comprises a drive and idler roll forming a front roll set for cradling the front wheels of the vehicle and wherein said at least one rear roll comprises a drive and idler roll forming a rear roll set for cradling the rear wheels of the vehicle, the drive rolls being coupled to the respective front and rear power supplying and/or absorbing units, the force sensing means, and the velocity sensing means.

27. The invention of claim 26 wherein the control means includes means responsive to the desired velocity signal and to measured speed signal of each drive roll which is driving or being driven by the associated vehicle wheels for generating an error speed signal for each driving or driven roll.

28. The invention of claim 27 wherein the control means further includes means responsive to each error speed signal for controlling the power supplying and/or absorbing unit coupled to each drive roll which is driving or being driven by the associated vehicle wheels to reduce the associated error signal toward zero.

29. The invention of claim 28 wherein the road load signal generating means provides a road load signal in accordance with:

$$RL = A + BV_s + CV_s^2 + DV_s^3 + EW$$

where:
RL = the road load signal;
$Vf_s$ = the measured speed signal of a selected drive roll being driven by the vehicle wheels;
W = the weight of the vehicle; and
A, B, C, D and E are constants.

30. The invention of claim 28 wherein $V_T$ is equal to the measured speed signal of the drive roll which is being driven or the average of the measured speed signals of both drive rolls when driven.

31. The invention of claim 28 wherein the parasitic loss signal generating means in response to the measured speed signals of the drive rolls provides a parasitic loss signal for the front and rear roll sets in accordance with:

$$PL_f = a + b\ V_f + cV_f^2 + dV_f^3 + I_f \underline{dV_r}/dt$$

$$PL_r = a + b\ V_r + cV_r^2 + dV_r^3 + I_r \underline{dV_f}/dt$$

where:
$I_f$ = the inertia of the front roll set;
$I_r$ = the inertia of the rear roll set;
$PL_f$ = the parasitic loss signal for the front roll set;
$PL_r$ = the parasitic loss signal for the rear roll set;
$V_f$ = the measured speed signal of the front drive roll;
$V_r$ = the measured speed signal of the rear drive roll; and
a, b, c, and d are constants.

32. The method of testing motor vehicles under simulated road conditions in which a plurality of wheels are coupled to the vehicle engine and at least one of the wheels is individually and positively driven comprising the steps of:

a) providing a separate dynamometer for each wheel of the vehicle which is coupled to the engine, each dynamometer including at least one roll for engaging the associated vehicle wheel, a power supplying and/or absorbing unit connected to the roll for supplying and/or absorbing power from the roll, force sensing means coupled to the roll for providing a signal representative of the force applied to or received from the roll by the wheel minus the force attributable to the parasitic losses of the roll, velocity sensing means coupled to the roll for providing a signal representative of the speed of the roll and means for providing inertia and road load signals representative of the forces attributable to the simulated inertia and the road load forces of the vehicle under test and means for providing a parasitic loss signal representative of the force attributable to the parasitic losses of the roll;

b) activating each of the power supplying and/or absorbing units; and c) controlling the power supplying and/or absorbing units to thereby control the speed of each dynamometer roll in accordance with:

$$V_d = \int_0^t \frac{(F_T + PL_T) - RL}{I} dt$$

where:
$V_d$ = the desired velocity of each dynamometer roll;
$F_T$ = the sum of the force signals delivered to or received from the rolls being driven by the vehicle;
$PL_T$ = the sum of the parasitic loss signals associated with the roll or rolls being driven by the vehicle;
RL = the road load signal; and
I = the inertia signal.

* * * * *

UNITED STATES PATENT AND TRADEMARK OFFICE
CERTIFICATE OF CORRECTION

PATENT NO. : 5,101,660
DATED : April 7, 1992
INVENTOR(S) : John T. La Belle

It is certified that error appears in the above—identified patent and that said Letters Patent is hereby corrected as shown below:

Column 1 line 25 after "vehicle" should be --.--.

Column 2 line 4 "$t_O$" should be --$t_o$--.

Column 2 line 7 "roll" should be --wheel/roll--.

Column 2 lines 55 and 56 delete "provide a viscous".

Column 4, line 38 after "68" should be --.--.

Column 5 line 62 "$F=F_f-PLf$" should be --$F=F_f-PL_f$--.

Column 7 line 10 after "velocity" should be --.--.

Column 10 line 31 "b" should be --be--.

Column 15 line 36 "$Vf_s$" should be --$V_s$--.

Signed and Sealed this

Fifteenth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,101,660
DATED : 4/7/92
INVENTOR(S) : John T. La Belle

It is certified that error appears in the above-indentified patent and that said Letters Patent is hereby corrected as shown below:

On the title page, item [73] should read as follows:

--Assignee: Clayton Industries, El Monte, Calif.--

Signed and Sealed this

Twenty-third Day of November, 1999

Attest:

Q. TODD DICKINSON

*Attesting Officer*   *Acting Commissioner of Patents and Trademarks*